US011880204B2

(12) United States Patent
Miller et al.

(10) Patent No.: US 11,880,204 B2
(45) Date of Patent: Jan. 23, 2024

(54) AUTOMATED RETURN OF TELEOPERATED VEHICLES

(71) Applicant: Boston Dynamics, Inc., Waltham, MA (US)

(72) Inventors: Thomas Hopkins Miller, Arlington, MA (US); Christopher Bentzel, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 187 days.

(21) Appl. No.: 17/206,490

(22) Filed: Mar. 19, 2021

(65) Prior Publication Data

US 2022/0197292 A1 Jun. 23, 2022

Related U.S. Application Data

(60) Provisional application No. 63/128,624, filed on Dec. 21, 2020.

(51) Int. Cl.
*G05D 1/02* (2020.01)
*G05B 19/042* (2006.01)

(52) U.S. Cl.
CPC ......... *G05D 1/0214* (2013.01); *G05B 19/042* (2013.01); *G05B 2219/23297* (2013.01)

(58) Field of Classification Search
CPC ................ G05D 1/0214; G05B 19/042; G05B 2219/23297
See application file for complete search history.

(56) References Cited

U.S. PATENT DOCUMENTS 9,246,749 B1 * 1/2016 Nguyen .............. H04L 41/0654
2006/0184279 A1 * 8/2006 Okamoto ................ B25J 5/007 700/245

OTHER PUBLICATIONS

Trach Bohdan et al.: "T-Lease a trusted lease primitive for distributed systems", Proceedings of the 11th ACM Symposium on Cloud Computing, ACMPUB27, New York, NY, USA, Oct. 12, 2020 (Oct. 12, 2020), pp. 387-400, XP058477980, DOI: 10.1145/3419111.3421273 ISBN: 978-1-4503-8137-6, 14 pages.

(Continued)

*Primary Examiner* — Anne Marie Antonucci
*Assistant Examiner* — Jingli Wang
(74) *Attorney, Agent, or Firm* — Knobbe, Martens, Olson & Bear, LLP

(57) ABSTRACT

A method includes obtaining, from an operator of a robot, a return execution lease associated with one or more commands for controlling the robot that is scheduled within a sequence of execution leases. The robot is configured to execute commands associated with a current execution lease that is an earliest execution lease in the sequence of execution leases that is not expired. The method includes obtaining an execution lease expiration trigger triggering expiration of the current execution lease. After obtaining the trigger, the method includes determining that the return execution lease is a next current execution lease in the sequence. While the return execution lease is the current execution lease, the method includes executing the one or more commands for controlling the robot associated with the return execution lease which cause the robot to navigate to a return location remote from a current location of the robot.

21 Claims, 11 Drawing Sheets

500

RECEIVING, FROM AN OPERATOR OF A ROBOT, A RETURN EXECUTION LEASE ASSOCIATED WITH ONE OR MORE COMMANDS FOR CONTROLLING THE ROBOT AND SCHEDULED WITHIN A SEQUENCE OF EXECUTION LEASES, THE ROBOT CONFIGURED TO EXECUTE COMMANDS ASSOCIATED WITH A CURRENT EXECUTION LEASE THAT IS THE EARLIEST EXECUTION LEASE IN THE SEQUENCE THAT IS NOT EXPIRED 502

OBTAINING AN EXECUTION LEASE RELEASE TRIGGER TRIGGERING EXPIRATION OF THE CURRENT EXECUTION LEASE 504

AFTER OBTAINING THE EXECUTION LEASE RELEASE TRIGGER, DETERMINING THAT THE RETURN EXECUTION LEASE IS THE NEXT CURRENT EXECUTION LEASE IN THE SEQUENCE 506

WHILE THE RETURN EXECUTION LEASE IS THE CURRENT EXECUTION LEASE, EXECUTING THE ONE OR MORE COMMANDS FOR CONTROLLING THE ROBOT ASSOCIATED WITH THE RETURN EXECUTION LEASE, THE ONE OR MORE COMMANDS FOR CONTROLLING THE ROBOT CAUSING THE ROBOT TO NAVIGATE TO A RETURN LOCATION REMOTE FROM A CURRENT LOCATION OF THE ROBOT 508

(56) References Cited

OTHER PUBLICATIONS

Cary G. Gray et al.: "Leases: an efficient fault-tolerant mechanism for distributed file cache consistency", Operating Systems Review, ACM, New York, NY, US, vol. 23, No. 5, Nov. 1, 1989 (Nov. 1, 1989), pp. 202-210, XP058378534, ISSN: 0163-5980, DOI: 10.1145/74851.74870, 9 pages.

International Search Report and Written Opinion for the related Application No. PCT/US2021/063786, dated Mar. 14, 2022, 38 pages.

* cited by examiner

200

AUTOMATED RETURN OF TELEOPERATED VEHICLES

CROSS REFERENCE TO RELATED APPLICATIONS

This U.S. patent application is a continuation of, and claims priority under 35 U.S.C. § 119(e) to U.S. Provisional Application 63/128,624, filed on Dec. 21, 2020. The disclosure of this prior application is considered part of the disclosure of this application and is hereby incorporated by reference in its entirety.

TECHNICAL FIELD

This disclosure relates to automated return of teleoperated vehicles.

BACKGROUND

Semi-autonomous robots and other vehicles are increasingly being used to navigate remote and often hazardous locations. These robots typically receive commands from an operator via wireless communications. However, the robots may be driven or navigated out of range of communications with the operator, preventing the operator from issuing commands to the robot. For example, the robot may enter an area with insufficient access to the wireless network the robot uses to receive commands from the operator. If the communication link becomes inactive while the robot is in a hazardous area, it may be impractical or impossible to reestablish a communications link.

SUMMARY

One aspect of the disclosure provides a method that, when executed by data processing hardware of a robot, causes the data processing hardware to perform operations. The operations include obtaining, from an operator of the robot, a return execution lease associated with one or more commands for controlling the robot. The return execution lease is scheduled within a sequence of execution leases and the robot is configured to execute commands associated with a current execution lease of the sequence of execution leases. The current execution lease is an earliest execution lease in the sequence of execution leases that is not expired. The operations also include obtaining an execution lease expiration trigger triggering expiration of the current execution lease. After obtaining the execution lease expiration trigger, the operations include determining that the return execution lease is the next current execution lease in the sequence of execution leases based on the expiration of the previous current execution lease. While the return execution lease is the current execution lease, the operations include executing the one or more commands for controlling the robot associated with the return execution lease, the one or more commands for controlling the robot causing the robot to navigate to a return location remote from a current location of the robot.

Implementations of the disclosure may include one or more of the following optional features. In some implementations, obtaining the execution lease expiration trigger includes determining that the robot has lost communication with the operator of the robot. In some examples, determining that the robot has lost communication with the operator of the robot includes determining that the robot has not received a communication from the operator of the robot for a threshold period of time. Optionally, the threshold period of time is configurable by the operator of the robot.

In some implementations, obtaining the execution lease expiration trigger includes receiving a lease expiration command from the operator of the robot. The operations may further include, after arriving at the return location, expiring the return execution lease. In some examples, the return location includes a location previously visited by the robot.

The operations may further include determining the return location based on the nearest location the robot previously received a communication from the operator of the robot. Optionally, the return location further includes a location a threshold distance from the current location of the robot. The operations, in some examples, further include determining a route to the return location for the robot to navigate based on a previous route taken by the robot to the current location of the robot and navigating the robot to the return location via the determined route.

Another aspect of the disclosure provides a robot including data processing hardware and memory hardware in communication with the data processing hardware. The memory hardware stores instructions that when executed on the data processing hardware cause the data processing hardware to perform operations. The operations include obtaining, from an operator of the robot, a return execution lease associated with one or more commands for controlling the robot. The return execution lease is scheduled within a sequence of execution leases and the robot is configured to execute commands associated with a current execution lease of the sequence of execution leases. The current execution lease is an earliest execution lease in the sequence of execution leases that is not expired. The operations also include obtaining an execution lease expiration trigger triggering expiration of the current execution lease. After obtaining the execution lease expiration trigger, the operations include determining that the return execution lease is the next current execution lease in the sequence of execution leases based on the expiration of the previous current execution lease. While the return execution lease is the current execution lease, the operations include executing the one or more commands for controlling the robot associated with the return execution lease, the one or more commands for controlling the robot causing the robot to navigate to a return location remote from a current location of the robot.

This aspect may include one or more of the following optional features. In some implementations, obtaining the execution lease expiration trigger includes determining that the robot has lost communication with the operator of the robot. In some examples, determining that the robot has lost communication with the operator of the robot includes determining that the robot has not received a communication from the operator of the robot for a threshold period of time. Optionally, the threshold period of time is configurable by the operator of the robot.

In some implementations, obtaining the execution lease expiration trigger includes receiving a lease expiration command from the operator of the robot. The operations may further include, after arriving at the return location, expiring the return execution lease. In some examples, the return location includes a location previously visited by the robot.

The operations may further include determining the return location based on the nearest location the robot previously received a communication from the operator of the robot. Optionally, the return location further includes a location or a threshold distance from the current location of the robot. The operations, in some examples, further include determining a route to the return location for the robot to navigate based on a previous route taken by the robot to the current location of the robot and navigating the robot to the return location via the determined route.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Semi-autonomous robots and other vehicles typically receive commands from an operator via wireless communications. However, the robot may navigate out of range of a vital communications link, preventing the operator from issuing commands to the robot. For example, the robot may enter an area with insufficient access to the wireless network the robot uses to receive commands from the operator. If the communication link becomes inactive while the robot is in a hazardous area, it may be impractical or impossible to reestablish a communications link.

Implementations herein are directed toward systems and methods for an automated return of a teleoperated (i.e., remote operation) of a vehicle such as a robot. The vehicle obtains commands queued for future execution pending a trigger. For example, the trigger is loss of communications between the vehicle and the operator of the vehicle. When the vehicle obtains the trigger, the vehicle executes the queued commands. The commands cause the vehicle to navigate to a return location (e.g., a location previously visited by the vehicle where the vehicle was able to successfully communicate with the operator).

Figure 1A:
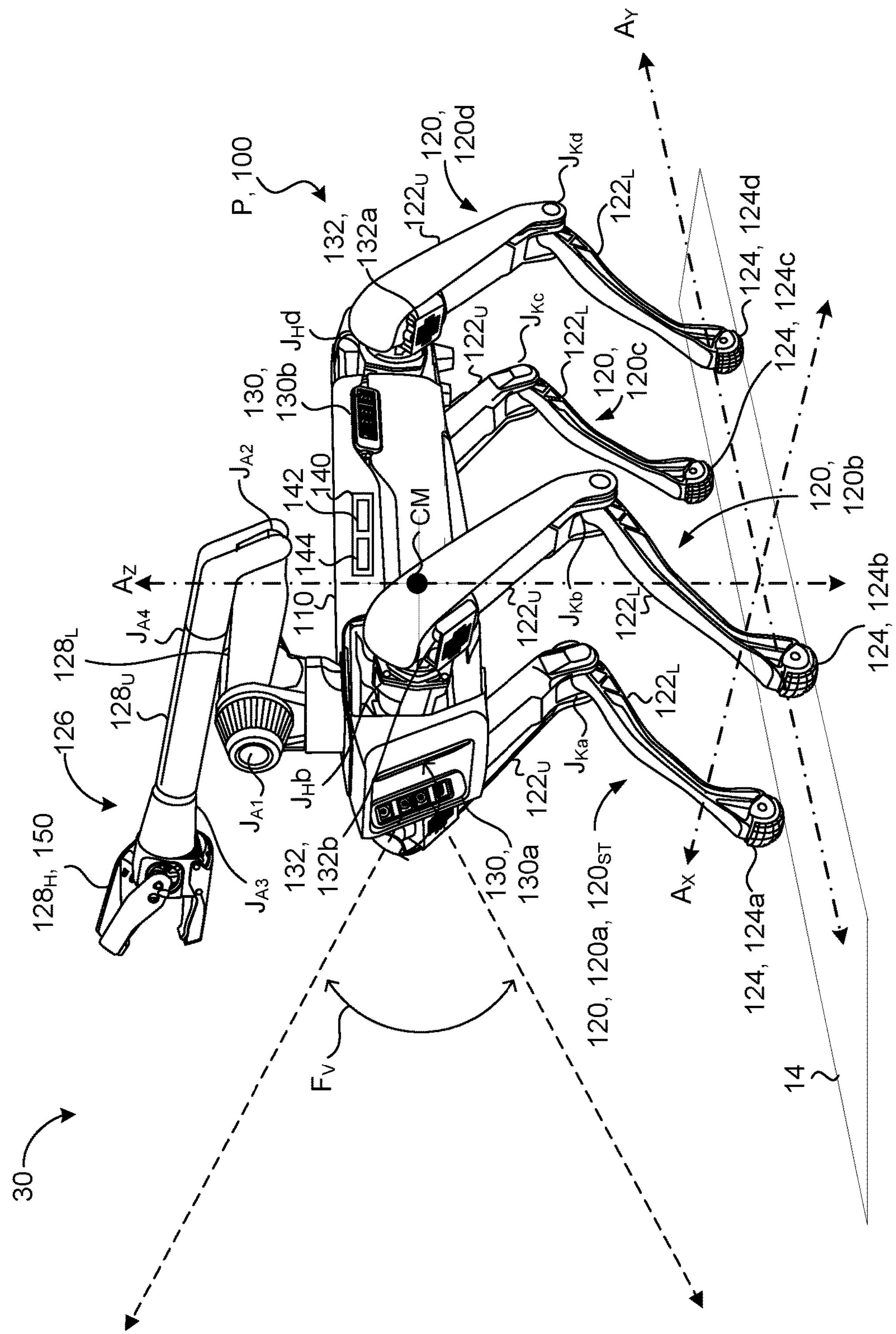
FIG. 1A is a schematic view of an example robot for navigating about an environment.
Figure 1B:
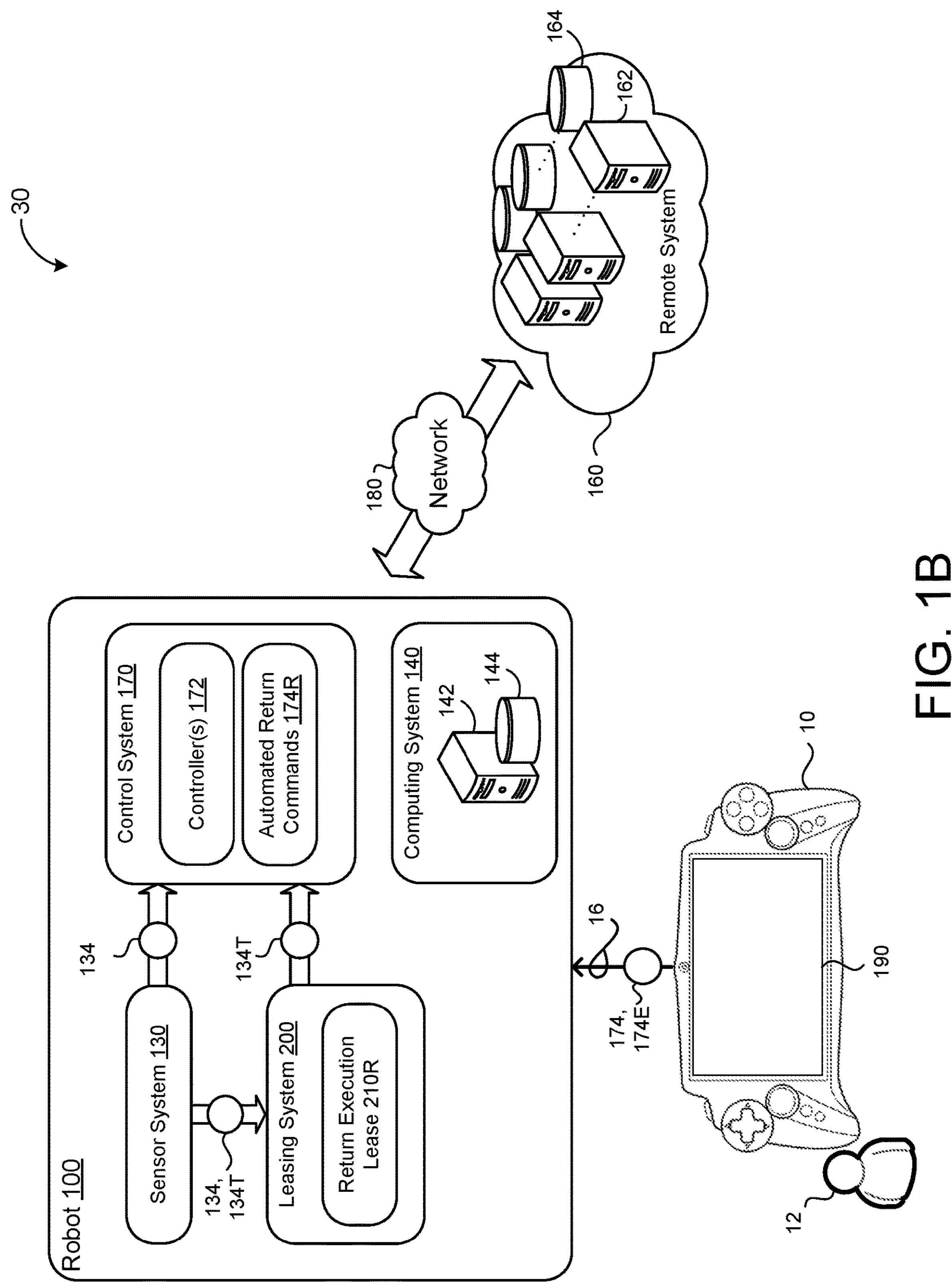
FIG. 1B is a schematic view of a leasing system for automatically returning the robot of FIG. 1A to a return location.

Referring to FIGS. 1A and 1B, in some implementations, a robot 100 includes a body 110 with locomotion based structures such as legs 120*a*-*d* coupled to the body 110 that enable the robot 100 to move about the environment 30. In some examples, each leg 120 is an articulable structure such that one or more joints J permit members 122 of the leg 120 to move. For instance, each leg 120 includes a hip joint JH coupling an upper member 122, 122U of the leg 120 to the body 110 and a knee joint JK coupling the upper member 122U of the leg 120 to a lower member 122L of the leg 120. Although FIG. 1A depicts a quadruped robot with four legs 120*a*-*d*, the robot 100 may include any number of legs or locomotive based structures (e.g., a biped or humanoid robot with two legs, or other arrangements of one or more legs) that provide a means to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member $\mathbf{122}_L$ of the leg 120.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1 depicts the arm 126 with three members 128 corresponding to a lower member $\mathbf{128}_L$, an upper member $\mathbf{128}_U$, and a hand member $\mathbf{128}_H$ (e.g., shown as an end-effector 150). Here, the lower member $\mathbf{128}_L$ may rotate or pivot about a first arm joint $J_{A1}$ located adjacent to the body 110 (e.g., where the arm 126 connects to the body 110 of the robot 100). The lower member $\mathbf{128}_L$ is coupled to the upper member $\mathbf{128}_U$ at a second arm joint $J_{A2}$ and the upper member $\mathbf{128}_U$ is coupled to the hand member $\mathbf{128}_H$ at a third arm joint $J_{A3}$. In some examples, such as FIG. 1A, the hand member $\mathbf{128}_H$ or end-effector 150 is a mechanical gripper that includes a moveable jaw and a fixed jaw configured to perform different types of grasping of elements within the environment 30. The moveable jaw is configured to move relative to the fixed jaw to move between an open position for the gripper and a closed position for the gripper. In some implementations, the arm 126 additionally includes a fourth joint $J_{A4}$. The fourth joint $J_{A4}$ may be located near the coupling of the lower member $\mathbf{128}_L$ to the upper member $\mathbf{128}_U$ and function to allow the upper member $\mathbf{128}_U$ to twist or rotate relative to the lower member $\mathbf{128}_L$. In other words, the fourth joint $J_{A4}$ may function as a twist joint similarly to the third joint $J_{A3}$ or wrist joint of the arm 126 adjacent the hand member $\mathbf{128}_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 attaches or detaches from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis Ax and the y-direction axis $A_Y$. The ground plane refers to a ground surface 14 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120*a* to a right side of the robot 100 with a second leg 120*b*). The frontal plane spans the X-Z plane by extending in directions of the x-direction axis Ax and the z-direction axis $A_Z$.

In order to maneuver about the environment 30 or to perform tasks using the arm 126, the robot 100 includes a sensor system 130 with one or more sensors 132, 132*a-n* (e.g., shown as a first sensor 132, 132*a* and a second sensor 132, 132*b*). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_v$ defining a sensing range or region corresponding to the sensor 132. For instance, FIG. 1A depicts a field of a view $F_V$ for the robot 100. Each sensor 132 may be pivotable and/or rotatable such that the sensor 132, for example, changes the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. The sensor system 130 may generate the field of view $F_v$ with a sensor 132 mounted on or near the body 110 of the robot 100 (e.g., sensor(s) 132*a*, 132*b*). The sensor system may additionally and/or alternatively generate the field of view $F_v$ with a sensor 132 mounted at or near the end-effector 150 of the arm 126 (e.g., sensor(s) 132*c*). The one or more sensors 132 capture the sensor data 134 that defines the three-dimensional point cloud for the area within the environment 30 about the robot 100. In some examples, the sensor data 134 is image data that corresponds to a three-dimensional volumetric point cloud generated by a three-dimensional volumetric image sensor 132. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132*a-b*). Here, these sensors 132 generate joint dynamics in the form of joint-based sensor data 134. Joint dynamics collected as joint-based sensor data 134 may include joint angles (e.g., an upper member $\mathbf{122}_U$ relative to a lower member $\mathbf{122}_L$ or hand member 126H relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170, a leasing system 200, and/or remote controller 10). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remote from the robot 100. For instance, the computing system 140 communicates via a network 180 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 reside on resources of the remote system 160.

In some implementations, as shown in FIGS. 1A and 1B, the robot 100 includes a control system 170. The control system 170 may be configured to communicate with systems of the robot 100, such as the at least one sensor system 130. The control system 170 may perform operations and other functions using hardware 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In additional examples, the controller 172 controls movement between poses and/or behaviors of the robot 100. At least one the controller 172 may be responsible for controlling movement of the arm 126 of the robot 100 in order for the arm 126 to perform various tasks using the end-effector 150. For instance, at least one controller 172 controls the end-effector 150 (e.g., a gripper) to manipulate an object or element in the environment 30. For example, the controller 172 actuates the movable jaw in a direction towards the fixed jaw to close the gripper. In other examples, the controller 172 actuates the movable jaw in a direction away from the fixed jaw to close the gripper.

A given controller 172 may control the robot 100 by controlling movement about one or more joints J of the robot 100. In some configurations, the given controller 172 is software or firmware with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $\mathbf{128}_H$) of the robot 100. By controlling one or more joints J, actuators or motors M, the controller 172 may coordinate movement for all different parts of the robot 100 (e.g., the body 110, one or more legs 120, the arm 126). For example, to perform some movements or tasks, a controller 172 may be configured to control movement of multiple parts of the robot 100 such as, for example, two legs 120*a-b*, four legs 120*a-d*, or two legs 120*a-b* combined with the arm 126.

With continued reference to FIG. 1B, an operator 12 (also referred to herein as a user or a client) may interact with the robot 100 via the remote controller 10 that communicates with the robot 100 to perform actions. For example, the operator 12 transmits commands 174 to the robot 100 (executed via the control system 170) via a wireless communication network 16. Additionally, the robot 100 may communicate with the remote controller 10 to display an image on a user interface 190 (e.g., UI 190) of the remote controller 10. For example, the UI 190 is configured to display the image that corresponds to three-dimensional field of view $F_V$ of the one or more sensors 132. The image displayed on the UI 190 of the remote controller 10 is a two-dimensional image that corresponds to the three-dimensional point cloud of sensor data 134 (e.g., field of view $F_V$) for the area within the environment 30 about the robot 100. That is, the image displayed on the UI 190 may be a two-dimensional image representation that corresponds to the three-dimensional field of view $F_V$ of the one or more sensors 132.

Figure 2A:
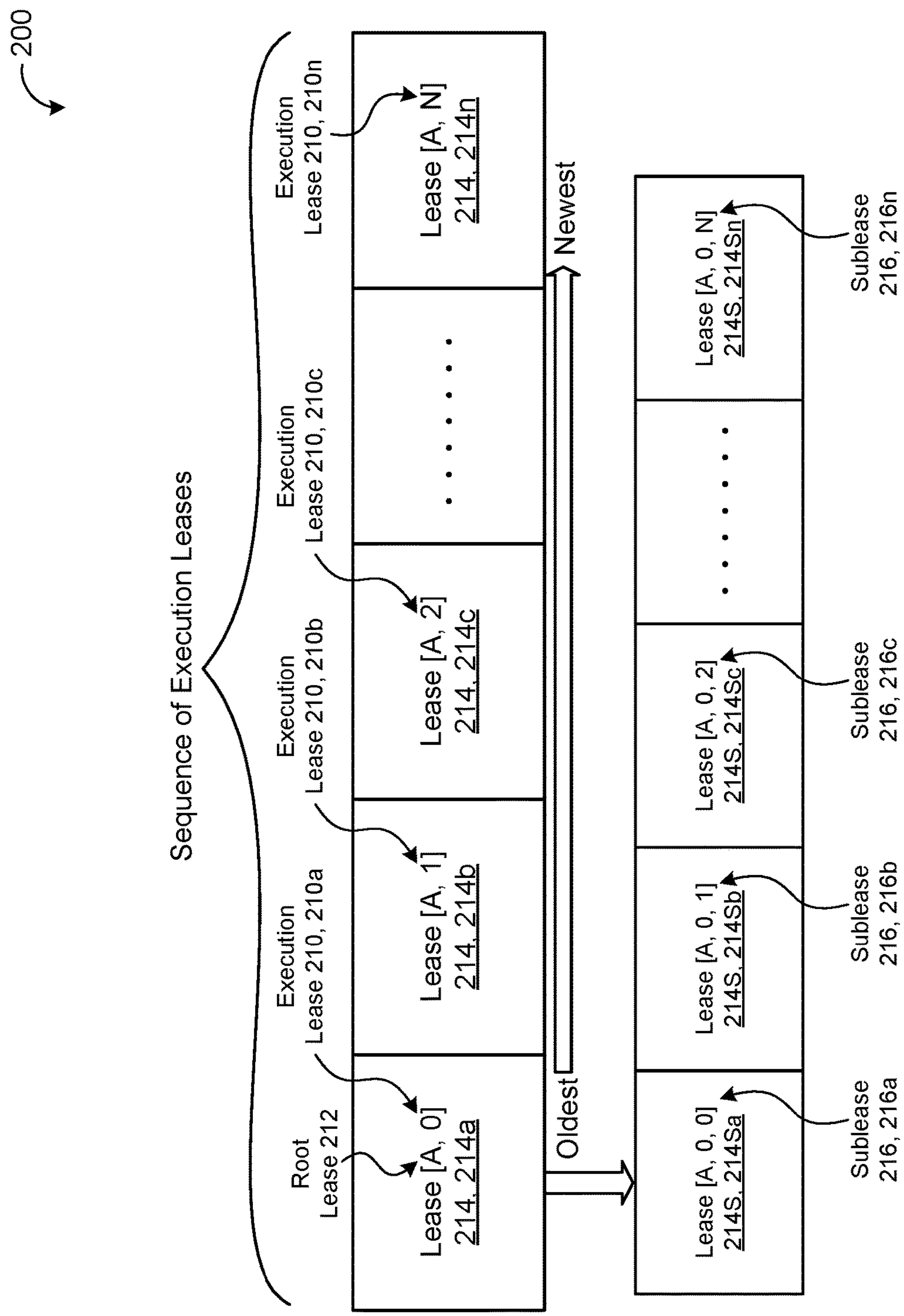
FIGS. 2A-2C are schematic views of a sequence of execution leases controlled by the leasing system 200 of FIG. 1B.
Figure 2B:
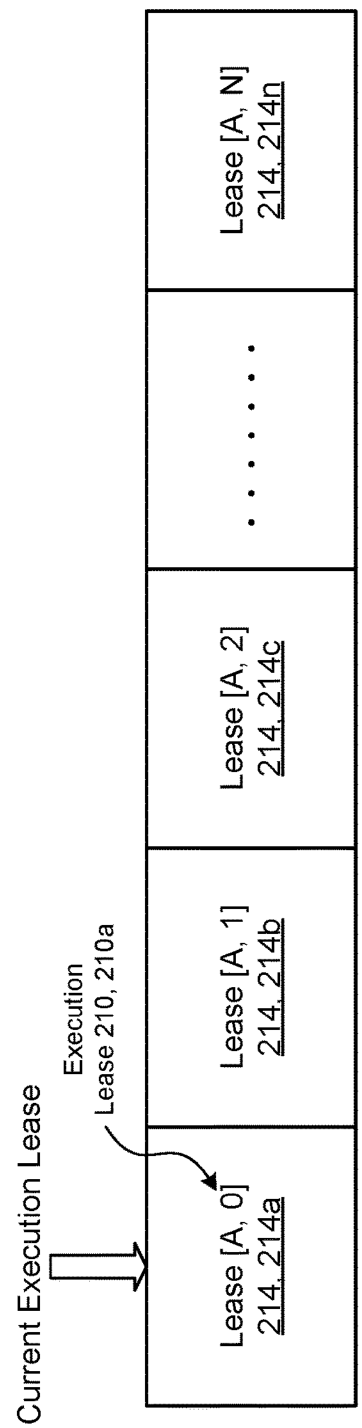
Figure 2C:
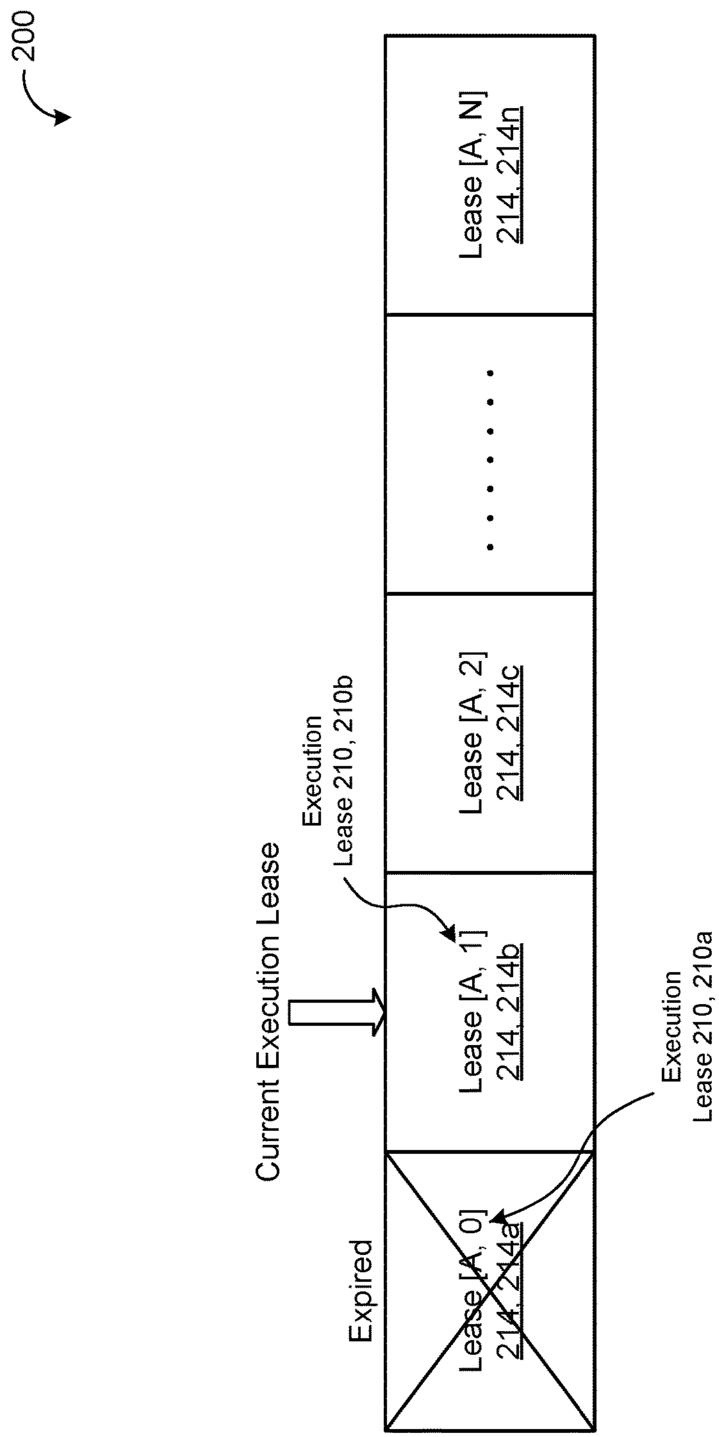

Referring now to FIGS. 2A-2C, the robot 100 may include the leasing system 200 to queue or otherwise delay the execution of one or more commands 174 for a point in the future based on obtaining an execution lease expiration trigger 134T which in turn may be based on sensor data 134. The lease system 200 obtains a sequence of execution leases 210, 210*a-n*. Each command 174 is associated with an execution lease 210 and the robot 100 is configured to only execute commands associated with a current execution lease 210 of the sequence of execution leases 210. The current execution lease 210 is defined as the oldest execution lease 210 in the sequence of execution leases 210 that has not yet expired. Each execution lease 210 may be associated with a root lease 212. The robot 100 may issue a root lease 212 to a client 12 when the client 12 requests a root lease 212 from the robot 100. When a new client 12 obtains control of the robot 100, the new client 12 may requests a new root lease 212, thus establishing a shared-resource management strategy.

Each execution lease 210 and/or root lease 212 may be associated with a numeric or alphanumeric identifier 214, 214*a-n* that identifies the respective root lease 212 and execution lease 210 and that increments or otherwise increases a value the newer the execution lease 210 is. For example, a first index in the identifier 214 references the root lease 212 while a second index in the identifier 214 references the execution lease 210.

In FIG. 2A, the lease system 200 includes the sequence of execution leases 210*a-n*. In this example, each of the execution leases is associated with the same root lease 212. Here, the root lease 212 is identified as 'A', but the root lease 212 may also be numeric. Thus, the first lease identifier 214 is [A, 0] which identifies the root lease 212 (i.e., 'A') and the execution lease 210*a* (i.e., '0'). The lease identifier 214 increments for each subsequent execution lease 210. That is, the next lease identifier 214 is [A, 1] and refers to the same root lease 212 (i.e., 'A') and the next execution lease 210 (i.e., '1'). Following this pattern, the next lease identifier 214 is [A, 2] and refers to the root lease 212 'A' and the execution lease 210 '2' and so on and so forth until the lease identifier 214*n* refers to the root lease 'A' and the execution lease 'N'. Here, the lease identifier 214*a* (i.e., [A, 0]) refers to the oldest execution lease 210*a* and the lease identifier 214*n* (i.e., [A, N]) refers to the newest execution lease 210*n* in the sequence of execution leases 210.

Each execution lease 210 may include one or more subleases 216, 216*a-n*. The subleases 216 may further delineate each root lease 212 by dividing execution of commands within a single execution lease 210. Here, the execution lease 210*a* includes the subleases 216*a-n* and is identified by the lease identifiers 214S, 214Sa-n. Specifically, the lease identifier 214S includes an extra index to refer to the sublease 216 (i.e., [A, 0, 0], [A, 0, 1], [A, 0, 2], and [A, 0, N]). Here, the sublease 216 associated with the lease identifier 214S [A, 0, 2] executes after the sublease 216 associated with the identifier 214S [A, 0, 1], but before the sublease 216 associated with the identifier 214S [A, 1, 0]. In some implementations, each sublease 216 includes further subleases (and the lease identifier 214 subsequently includes further indexes to represent the subleases).

In some implementations, each command 174 obtained by the robot 100 is associated with an execution lease 210 (and, when included, sublease 216). The robot 100 is configured to only execute commands associated with the current execution lease 210 and sublease 216. The current execution lease 210 is defined as the oldest execution lease 210 (e.g., the lowest or smallest index) that has not expired. Similarly, the current sublease 216 of the current execution lease 210 is the oldest sublease 216 (e.g., the lowest or smallest index) that has not expired.

For example, in FIG. 2B, the lease identifier 214*a* ([A, 0]) refers to the current execution lease 210*a* as the execution lease 210*a* is the oldest execution lease 210 (i.e., the earliest in the sequence of execution leases) that is not expired. Referring now to FIG. 2C, in this example, the execution lease 210*a* has expired, thus making the next execution lease 210 in the sequence (i.e., execution lease 210*b*) the current execution lease 210. A similar technique may be used to determine a current sublease 216 of the current execution lease 210. Thus, in FIG. 2B, the robot 100 executes commands associated with the execution lease 210*a* (and root lease 212 of 'A') while in FIG. 2C the robot 100 instead executes commands associated with the execution lease 210*b* (and root lease 212 'A').

Referring back to FIG. 1B, in some implementations, the leasing system 200 obtains, from the operator 12 of the robot 100, a return execution lease 210R associated with one or more automated return commands 174R for controlling the robot 100. For example, the operator 12 issues a command 174 to enable and/or schedule the return execution lease 210R which is associated with the automated return commands 174R previously obtained by the robot 100. The automated return commands 174R are commands that, when executed by the control system 170, cause the robot 100 to navigate to or toward a remote location. The operator 12 may provide the automated return commands 174R while alternatively the automated return commands 174R may be established by a manufacturer of the robot 100 and further configured by the operator 12. In some examples, the robot 100 automatically determines the automated return commands 174R based on its own sensors and programming.

The leasing system 200 may expire an execution lease 210 based on obtaining the execution lease expiration trigger 134T. The execution lease expiration trigger 134T, in some examples, is based on sensor data 134 captured by the sensor system 130. For example, the execution lease expiration trigger 134T is an indication that the sensor system 130 has lost communication with the operator 12. For instance, the operator 12 may send periodic commands 174 or messages to the robot 100 via the wireless communication network 16. When the sensor system 130 determines that the robot 100 has not received a valid message/command from the operator 12 for a threshold period of time (e.g., three seconds), the sensor system 130 may determine that the robot 100 has lost communications (i.e., via the wireless communication network 16) and send the execution lease expiration trigger 134T to the leasing system 200. The threshold period of time may be configurable by the operator 12. The leasing system 200 may receive the execution lease expiration trigger 134T for other reasons as well. For example, the operator 12 sends a lease expiration command 174E to command an execution lease expiration trigger 134T, thus forcing the leasing system 200 to increment the current execution lease 210 to the next execution lease 210 in the sequence of execution leases 210. That is, in some examples, the robot 100 receives a command with a newer lease, which acts as a lease expiration trigger 134T.

In some examples, after obtaining the execution lease expiration trigger 134T, the leasing system 200 determines that the return execution lease 210R is the next current execution lease 210 in the sequence of execution leases 210 based on the expiration of the previous execution lease 210. As discussed in more detail below, while the return execution lease 210R is the current execution lease, the control system 170 executes the one or more automated return commands 174R which cause the robot 100 to navigate to a return location 410 (FIG. 4B) that is remote from the current location of the robot 100.

Figure 3:
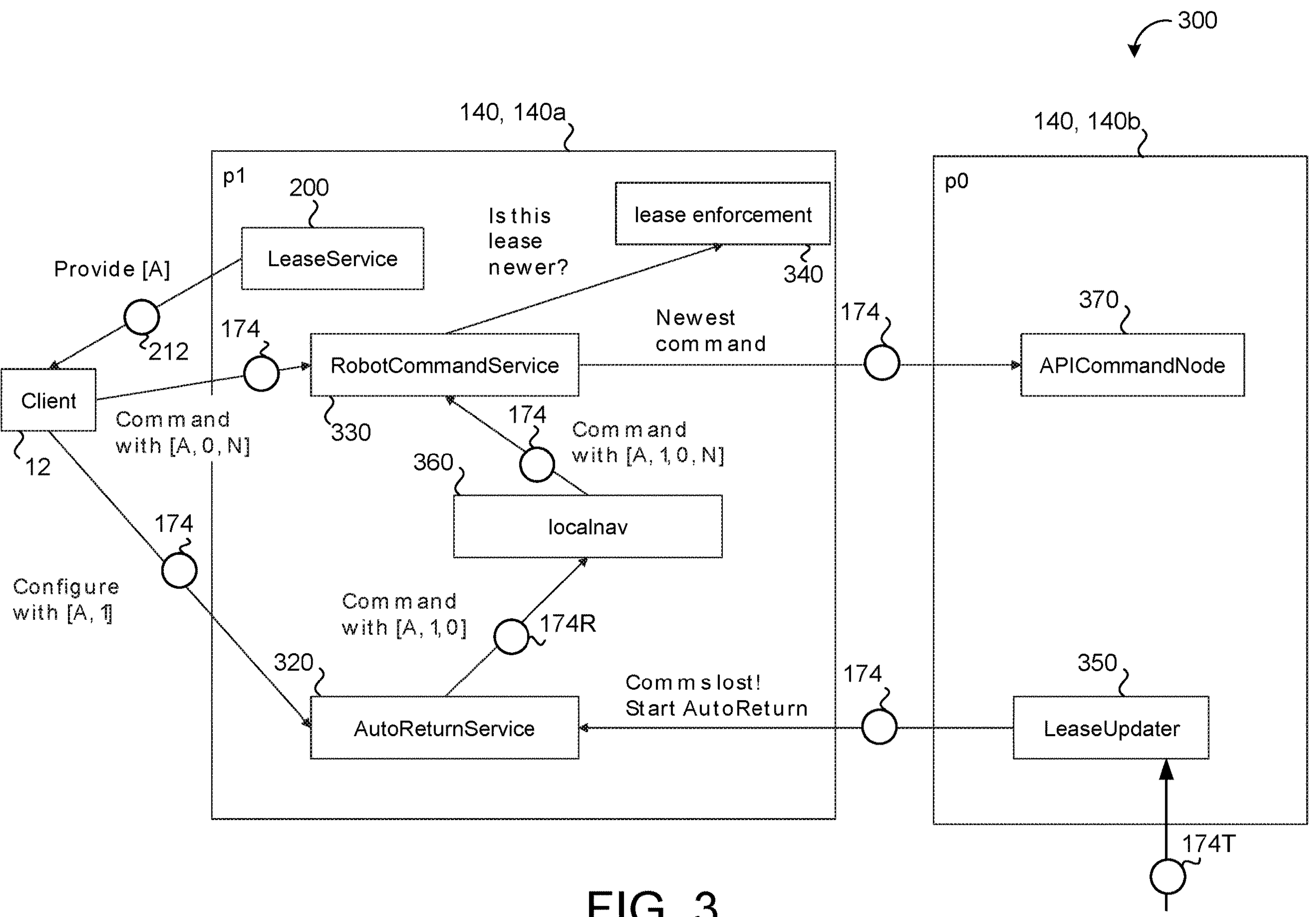
FIG. 3 is a schematic view of a block diagram of control systems of the robot of FIG. 1A for automatically returning the robot to the return location.

Referring now to FIG. 3, an example block diagram 300 divides the computing system 140 of the robot 100 into a first computing system 140*a* and a second computing system 140*b*. Here, the operator 12 (i.e., the client) requests a root lease 212 from the leasing system 200 (i.e., "LeaseService") and receives the root lease 12 (i.e., "[A]") from the leasing system 200. Thus, the current execution lease 210 is '0' and is associated with the lease identifier 214 [A, 0, N] (with 'N' being a sublease 216 of the execution lease 210). The operator 12 enables an automated return service 320 (i.e., "AutoReturnService") by assigning the automated return service 320 the execution lease 210 of '1' (i.e., [A, 1, 0]). Because the execution lease 210 of '1' is not the current execution lease 210 (i.e., '0') when the operator 12 enables the automated return service 320, the automated return commands 174R associated with the automated return service 320 will not be executed by the robot 100 until some point in the future (i.e., until after the current execution lease 210 expires).

While the current execution lease 210 remains '0', the operator 12 transmits commands 174 to a robot command service 330 (i.e., "RobotCommandService") to control the robot 100. Each command 174 may include the lease identifier 214 [A, 0, N] to associated the command(s) 174 with the current execution lease 210 (i.e., '0'). A lease enforcement module 340 (which may be part of or independent from the leasing system 200) may ensure that the command 174 is associated with the current execution lease 210 prior to the robot 100 executing the command 174. When the command 174 is not associated with the current execution lease 210, the lease enforcement module 340 may disregard and/or discard the command 174. The lease enforcement module 340 may, when the command is associated with a future execution lease 210, associate and queue the command 174 for execution when the future execution lease 210 becomes the current execution lease 210.

Once the lease enforcement module 340 confirms that the command 174 is associated with the current execution lease 210, the robot command service 330 may transmit the command 174 to a command node 370 (i.e., "APICommandNode") to execute the command 174. For example, the command 174 causes the robot 100 to navigate to a new location further away from the operator 12.

In this example, when a lease updater module 350 (which may be part of or independent from the leasing system 200) receives the execution lease expiration trigger 134T indicating that the robot 100 has lost communications with the operator 12 (e.g., because the robot 100 has not received a command 174 from the operator 12 for a threshold period of time), the lease updater module 350 expires the current execution lease 210 and determines that the next current execution lease (i.e., [A, 1]) is associated with the automated return service 320, and sends a command 174 to enable the automated return service 320. Alternatively, the lease updater module 350 triggers the automated return service 320 without determining the next execution lease. In response, the automated return service 320 executes the one or more automated return commands 174R. For example, the automated return service 320 transmits a command 174R to a local navigation module 360 (i.e., "localnav") responsible for performing local navigation for the robot 100. In some examples, when the local navigation module 360 receives the automated return command 174R, the previous lease is expired (i., [A, 0]) and the next execution lease becomes the current execution lease (i.e., [A, 1]). The command 174R (associated with the lease identifier 214 [A, 1, 0]) commands the local navigation module 360 to navigate to the return location 410 (FIG. 4B). In turn, the local navigation module 360 transmits commands 174 to the robot command service 330 for navigating the robot 100. Optionally, the local navigation module 360 uses an additional sublease (i.e., [A, 1, 0, N]) for the commands 174, but these commands 174 are still associated with the same execution lease 210 (i.e., '1'). The robot command service 330, once the lease enforcement module 340 determines that the commands 174 from the local navigation module 360 are associated with the current execution lease 210, issues the commands 174 to the command node 370 for execution. The command node 370 executes the command to navigate the robot 100 to the return location 410.

In some implementations, the automated return command 174R includes one or more parameters defining the robot's movement as the robot 100 executes the automated return command 174R. For example, the parameters define how fast the robot 100 moves, how close the robot 100 is allowed to get to obstacles, whether the robot is allowed to step into terrain that is not clearly visible by the sensors, etc. Some or all of the parameters may be configured by the operator 12 (e.g., a maximum velocity) while some or all parameters may be predetermined (e.g., by the manufacturer) or determined by the conditions of the environment. In some examples, the parameters are defined by the parameters in use during the "outbound" trip by the robot 100. That is, the robot 100 may use the same parameters while executing the automated return command 174R that were used while executing the previous command.

Figure 4A:
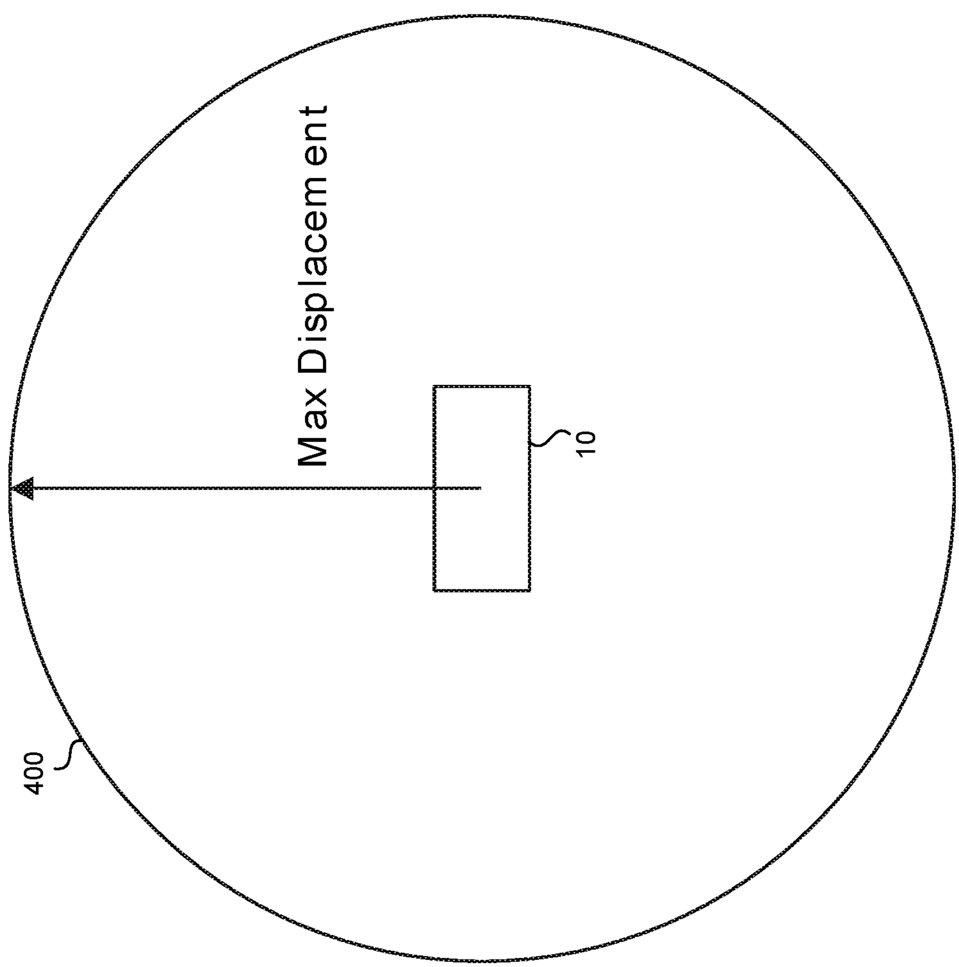
FIG. 4A is a schematic view of a maximum displacement for the robot of FIG. 1A.
Figure 4B:
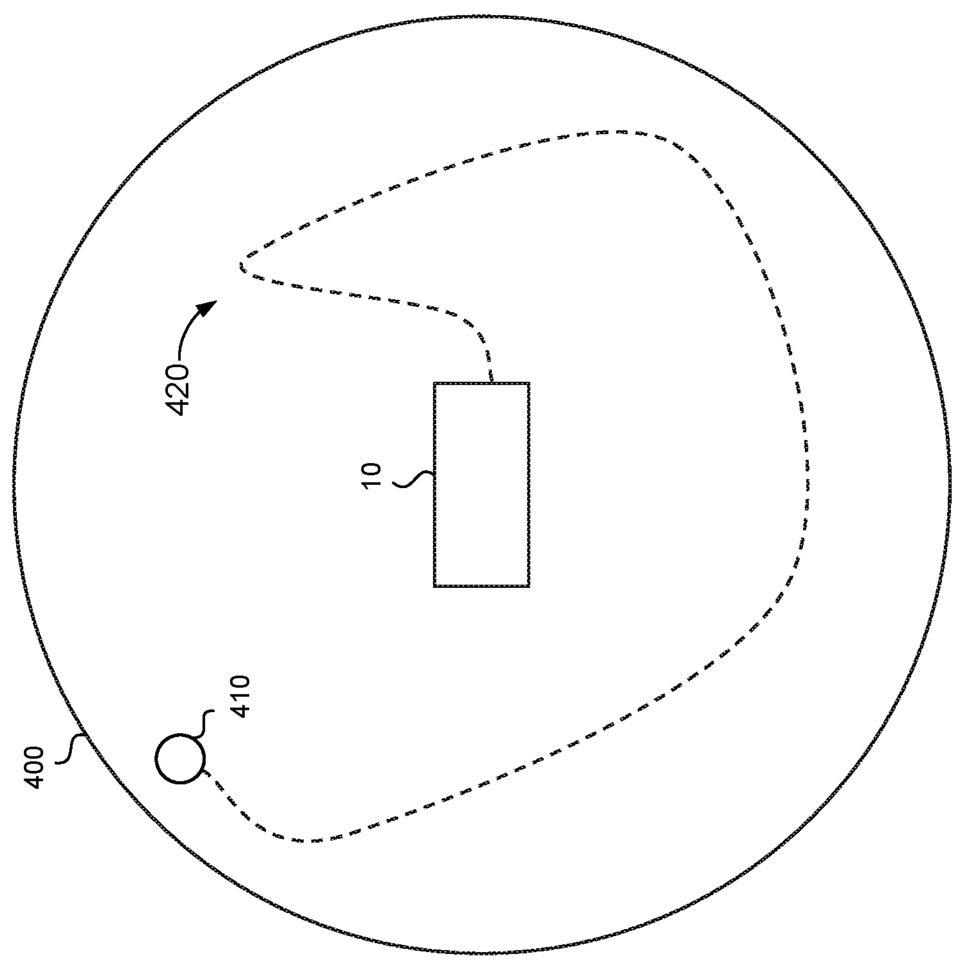
FIGS. 4B and 4C are schematic views of exemplary routes for navigating the robot to the return location.
Figure 4C:
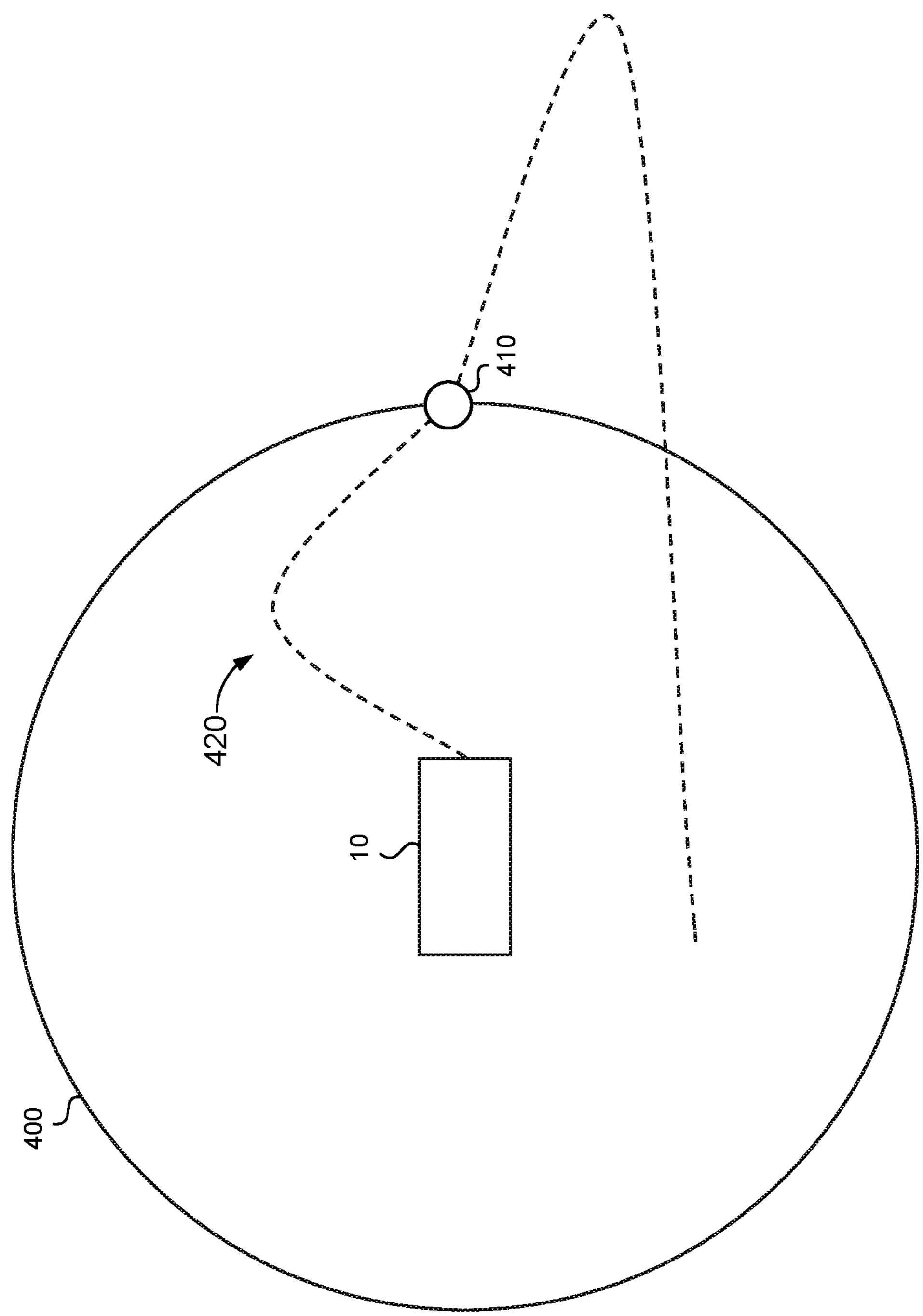

Referring now to FIGS. 4A-4C, in some implementations, the automated return service 320 is limited by a maximum displacement 400 of the robot 100 from its current location. That is, the automated return service 320 cannot command the robot 100 to travel a distance from the current location of the robot 100 (defined by the location the robot 100 occupies when the automated return service 320 is enabled) that is greater than a threshold distance (i.e., the maximum displacement 400). The maximum displacement 400 may be configurable by the operator 12. For example, the operator determines the maximum displacement 400 when assigning the lease to the automated return service 320.

Referring now to FIG. 4B, in some examples, the return location 410 is a location previously visited by the robot 100. For example, a route 420 represents a path traversed by the robot 100 to arrive at the current location of the robot 100. The robot 100 may determine a route to travel to the return location 410 based on "backtracking" (i.e., retracing) along the previous route 420 until arriving at the return location 410. In some examples, the robot 100 reverses along the route 420 in the exact same manner as the robot initially traversed the route 420.

As shown in FIG. 4B, the return location 410 may be an origination point of the route 420. However, as shown in FIG. 4C, the return location 410 may be limited by the maximum displacement 400. Here, the route 420 passes beyond a distance from the robot 100 marked by the maximum displacement 400 prior to returning to a distance within the maximum displacement 400. In this situation, the robot 100 may retrace the route 420 until the maximum displacement 400 is reached and halt any further navigation. Thus, in this example, the return location 410 is at the maximum displacement 400.

As the robot is retracing the route 420, the robot 100 may reestablish communications with the operator 12. For example, the robot 100 loses communications with the operator 12 because the robot 100 navigated to a location without sufficient wireless coverage. When this occurs and the automated return service 320 is enabled, the robot begins backtracking along the route 420 and may reestablish communications with the operator 12 at any point. The robot 100 may automatically halt the automated return service 320 as soon as successful communication with the operator 12 is reestablished. The robot 100 may automatically expire the current execution lease 210 (i.e., the return execution lease 210R) once the return location is reached and/or communications with the operator 12 is reestablished. Alternatively, the operator 12 may command the robot to halt the automated return service 320 when communication is reestablished (e.g., by expiring the current execution lease 210). Thus, operators may resume control quickly by incrementing the execution lease 210 while new operators 12 do not need to be concerned with prior configuration of the automated return service 320 as the execution lease 210 associated with the previous operator 12 is expired and the leasing system 200 prohibits a command 174 with an expired lease 210 to be executed.

In some implementations, the automated return service 320 determines the return location 410 based on the nearest location the robot 100 previously received a communication (e.g., a command 174) from the operator 12 of the robot 100. That is, the automated return service 320 may establish the return location 410 based on the nearest location that the robot was in successful communication with the operator 12. The robot 100 may determine the return location 410 based on any number of other factors as well. For example, the robot 100 attempts to navigate toward a last known location of the operator 12 or the robot 100 may attempt to navigate toward a predetermined location configured by the operator 12. As yet another example, the robot 100 navigates in a predetermined direction until communication with the operator 12 is reestablished and/or the maximum displacement 400 is reached.

While examples herein describe a teleoperated robot 100 navigating to a return location 410 based on a trigger, the robot 100 is not intended to be limiting and any semi-autonomous mobile vehicle is within the scope of the inventions described herein.

Figure 5:
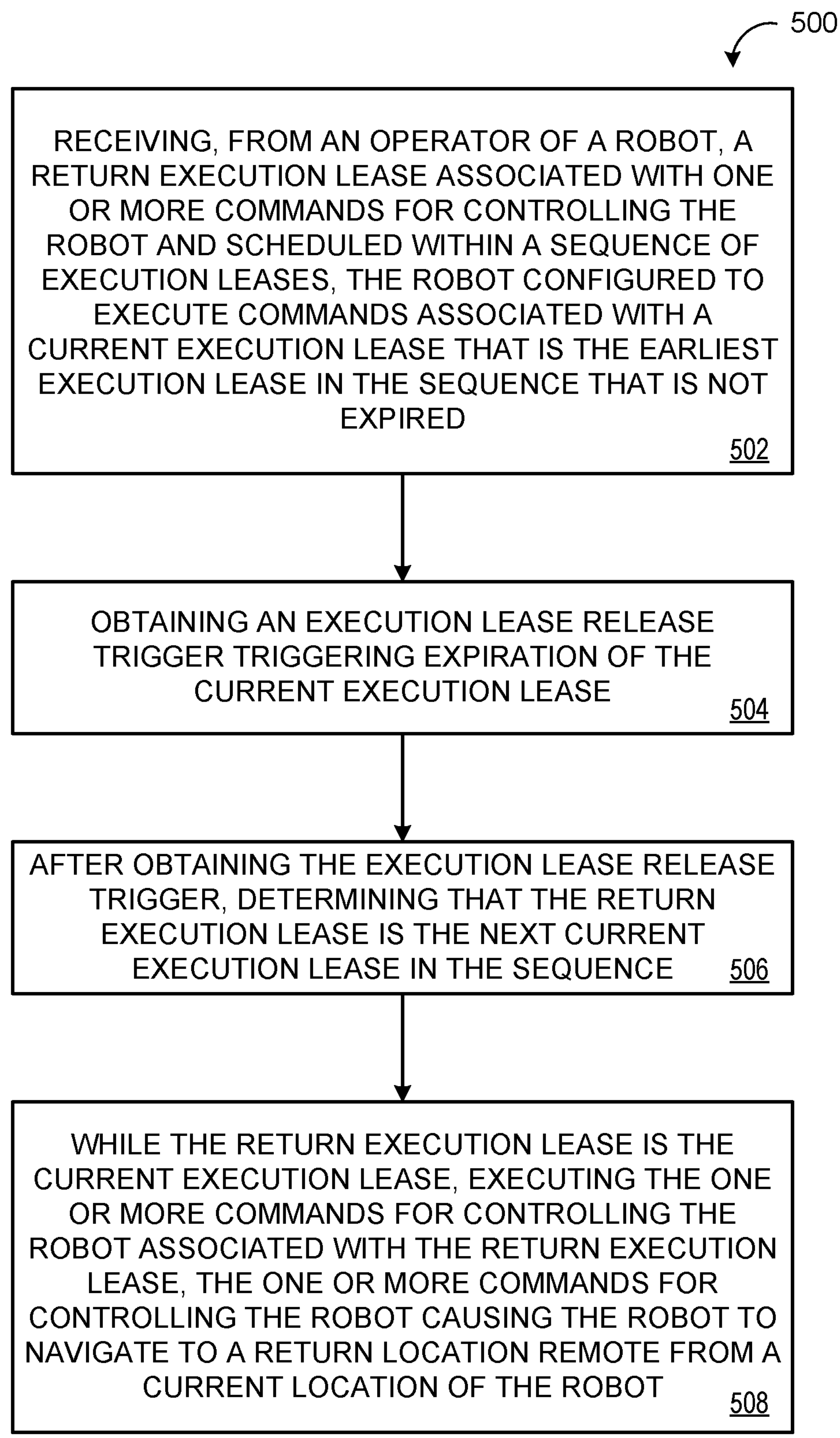
FIG. 5 is a flowchart of an example arrangement of operations for a method of an automatic return of a teleoperated vehicle.

FIG. 5 is a flowchart of an example arrangement of operations for operations for a method 500 for automated return of a teleoperated vehicle. The computer-implemented method 500, when executed by data processing hardware 142 of a vehicle such as a robot 100 causes the data processing hardware 142 to perform operations. The operations, at step 502 include obtaining, from an operator 12 of the robot 100, a return execution lease 210R associated with one or more commands 174R for controlling the robot 100. The return execution lease 210R is scheduled within a sequence of execution leases 210 and the robot 100 is configured to execute commands 174 associated with a current execution lease 210 of the sequence of execution leases 210. The current execution lease 210 is an earliest execution lease 210 in the sequence of execution leases 210 that is not expired.

At step 504, the operations include obtaining an execution lease expiration trigger 134T triggering expiration of the current execution lease 210. At step 506, the operations include, after obtaining the execution lease expiration trigger 134T, determining that the return execution lease 210R is the next current execution lease 210 in the sequence of execution leases 210 based on the expiration of the previous current execution lease 210. While the return execution lease 210R is the current execution lease 210, the operations also include, at step 508, executing the one or more commands 174R for controlling the robot 100 associated with the return execution lease 210R. The one or more commands 174R for controlling the robot 100 cause the robot 100 to navigate to a return location 410 remote from a current location of the robot 100.

Figure 6:
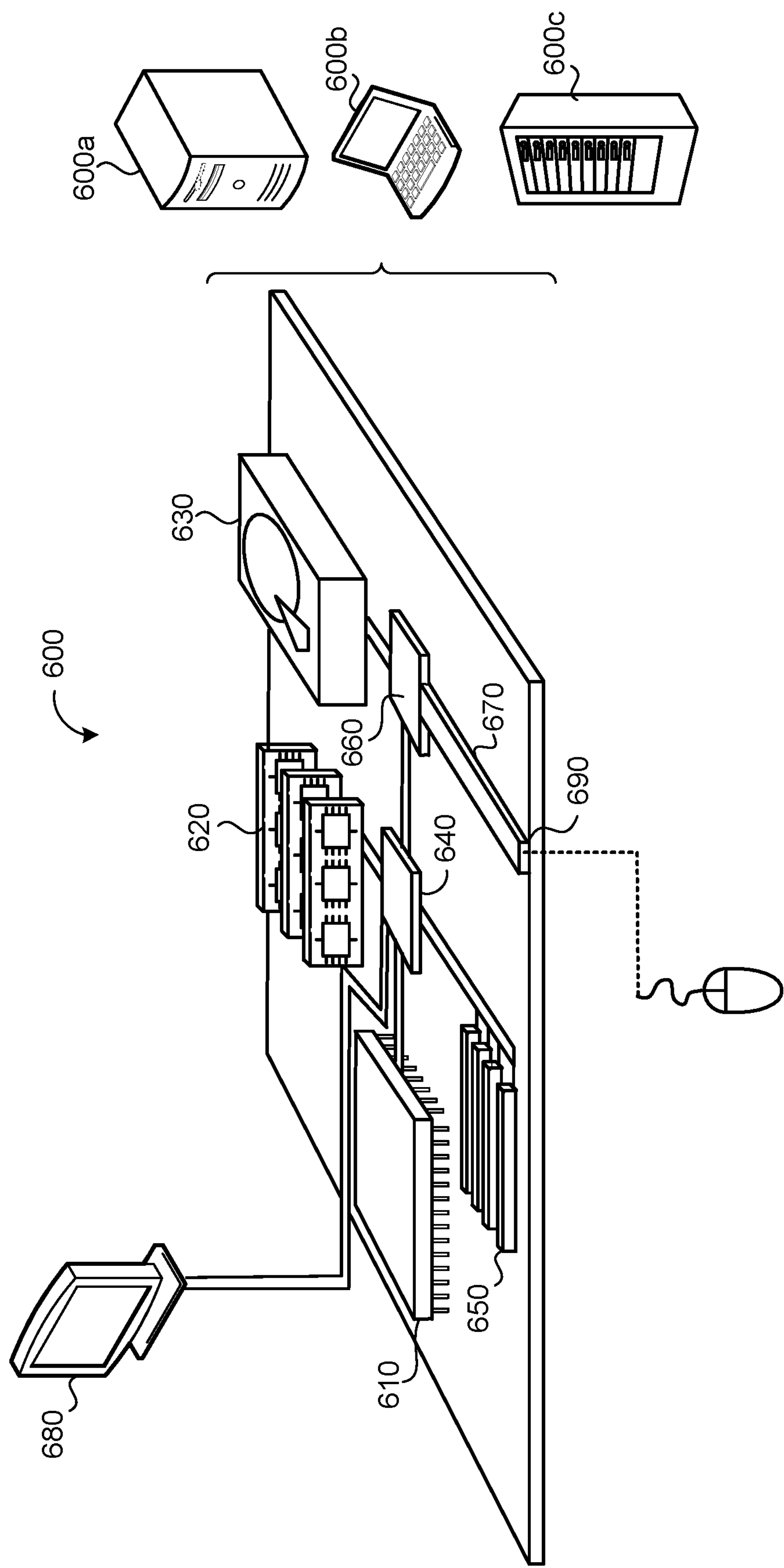
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a robot causes the data processing hardware to perform operations comprising:

obtaining, by the robot, a queue of execution leases, each execution lease in the queue of execution leases associated with at least one command for the robot, the queue of execution leases including a return execution lease;

obtaining an execution lease expiration trigger triggering expiration of a current execution lease of the queue of execution leases, wherein the current execution lease is an earliest execution lease in the queue of execution leases that is not expired;

after obtaining the execution lease expiration trigger, determining that the return execution lease is a next current execution lease in the queue of execution leases based on the expiration of the previous current execution lease; and while the return execution lease is the current execution lease, executing the one or more commands for controlling the robot associated with the return execution lease, the one or more commands for controlling the robot causing the robot to navigate to a return location remote from a current location of the robot.

2. The method of claim 1, wherein obtaining the execution lease expiration trigger comprises determining that the robot has lost communication with an operator of the robot.

3. The method of claim 2, wherein determining that the robot has lost communication with the operator of the robot comprises determining that the robot has not received a communication from the operator of the robot for a threshold period of time.

4. The method of claim 3, wherein the threshold period of time is configurable by the operator of the robot.

5. The method of claim 1, wherein obtaining the execution lease expiration trigger comprises receiving a lease expiration command from an operator of the robot.

6. The method of claim 1, wherein the operations further comprise, after arriving at the return location, expiring the return execution lease.

7. The method of claim 1, wherein the return location comprises a location previously visited by the robot.

8. The method of claim 7, wherein the operations further comprise determining the return location based on the nearest location the robot previously received a communication from an operator of the robot.

9. The method of claim 7, wherein the return location further comprises a location a threshold distance from the current location of the robot.

10. The method of claim 1, wherein the operations further comprise:

determining a route to the return location for the robot to navigate based on a previous route taken by the robot to the current location of the robot; and navigating the robot to the return location via the determined route.

11. The method of claim 1, wherein the queue of execution leases is associated with a first root lease, and the first root lease is associated with a first operator, the method further comprising:

receiving a request for a new root lease from a second operator of the robot;

issuing a second root least associated with the second operator; and employing a shared-resource management strategy to manage the first root lease and the second root lease.

12. A robot comprising:

data processing hardware; and memory hardware in communication with the data processing hardware, the memory hardware storing instructions that when executed on the data processing hardware cause the data processing hardware to perform operations comprising:

obtaining, by the robot, a queue of execution leases, each execution lease in the queue of execution leases associated with at least one command for the robot, the queue of execution leases including a return execution lease;

obtaining an execution lease expiration trigger triggering expiration of a current execution lease of the queue of execution leases, wherein the current execution lease is an earliest execution lease in the queue of execution leases that is not expired;

after obtaining the execution lease expiration trigger, determining that the return execution lease is a next current execution lease in the queue of execution leases based on an expiration of the previous current execution lease; and while the return execution lease is the current execution lease, executing the one or more commands for controlling the robot associated with the return execution lease, the one or more commands for controlling the robot causing the robot to navigate to a return location remote from a current location of the robot.

13. The robot of claim 12, wherein obtaining the execution lease expiration trigger comprises determining that the robot has lost communication with an operator of the robot.

14. The robot of claim 13, wherein determining that the robot has lost communication with the operator of the robot comprises determining that the robot has not received a communication from the operator of the robot for a threshold period of time.

15. The robot of claim 14, wherein the threshold period of time is configurable by the operator of the robot.

16. The robot of claim 12, wherein obtaining the execution lease expiration trigger comprises receiving a lease expiration command from an operator of the robot.

17. The robot of claim 12, wherein the operations further comprise, after arriving at the return location, expiring the return execution lease.

18. The robot of claim 12, wherein the return location comprises a location previously visited by the robot.

19. The robot of claim 18, wherein the operations further comprise determining the return location based on the nearest location the robot previously received a communication from an operator of the robot.

20. The robot of claim 18, wherein the return location further comprises a location a threshold distance from the current location of the robot.

21. The robot of claim 12, wherein the operations further comprise:

determining a route to the return location for the robot to navigate based on a previous route taken by the robot to the current location of the robot; and navigating the robot to the return location via the determined route.

* * * * *